Oct. 22, 1929.  L. R. HEIM  1,733,087
GRINDING APPARATUS
Original Filed April 14, 1922   3 Sheets-Sheet 1

Fig. 1.

Inventor
Lewis R. Heim
By his Attorneys
Emery, Varney, Blair & Hognet

Oct. 22, 1929.  L. R. HEIM  1,733,087
GRINDING APPARATUS
Original Filed April 14, 1922  3 Sheets-Sheet 3

Lewis R. Heim Inventor
By his Attorneys
Emery, Varney, Blair & Hoquet

Patented Oct. 22, 1929

1,733,087

UNITED STATES PATENT OFFICE

LEWIS R. HEIM, OF MOUNT DORA, FLORIDA, ASSIGNOR, BY MESNE ASSIGNMENTS, TO CINCINNATI GRINDERS INCORPORATED, OF CINCINNATI, OHIO, A CORPORATION OF OHIO

GRINDING APPARATUS

Application filed April 14, 1922, Serial No. 552,566. Renewed December 27, 1928.

This invention relates to grinding apparatus.

One of the objects of this invention is to provide grinding apparatus, particularly adapted for the grinding of cylindrical bodies or articles, of practical and flexible construction and of extended range of application and use. Another object is to provide apparatus of the above nature of reliable and efficient action and capable of producing accurate results. Another object is to provide an attachment of simple and practical construction capable of being readily incorporated with a grinding machine not only to broaden the field of use thereof but also to increase the speed of operation and the rate of production of the machine. Other objects will be in part obvious and in part pointed out hereinafter.

The invention accordingly consists in the features of construction, combinations of elements and arrangement of parts as will be exemplified in the structure to be hereinafter described and the scope of the application of which will be indicated in the following claims.

In the accompanying drawings in which is shown one of various possible embodiments of this invention.

Similar reference characters refer to similar parts throughout the several views of the drawings.

Figure 1:
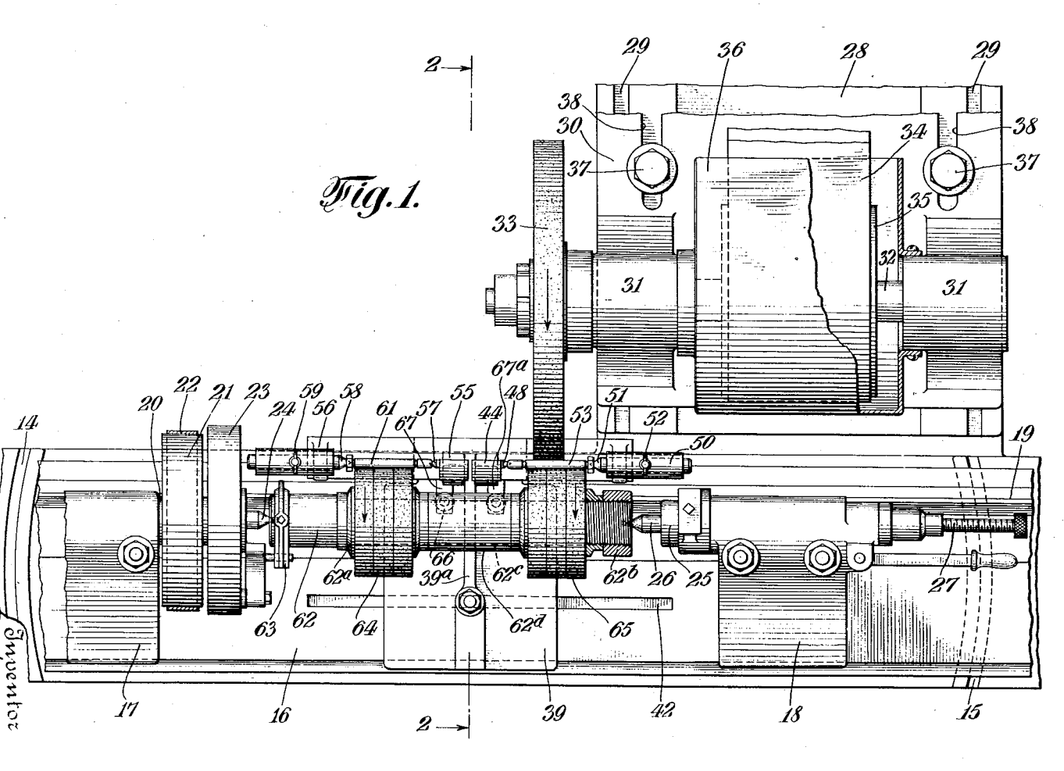
Figure 1 is a plan view of the apparatus.
Figure 2:
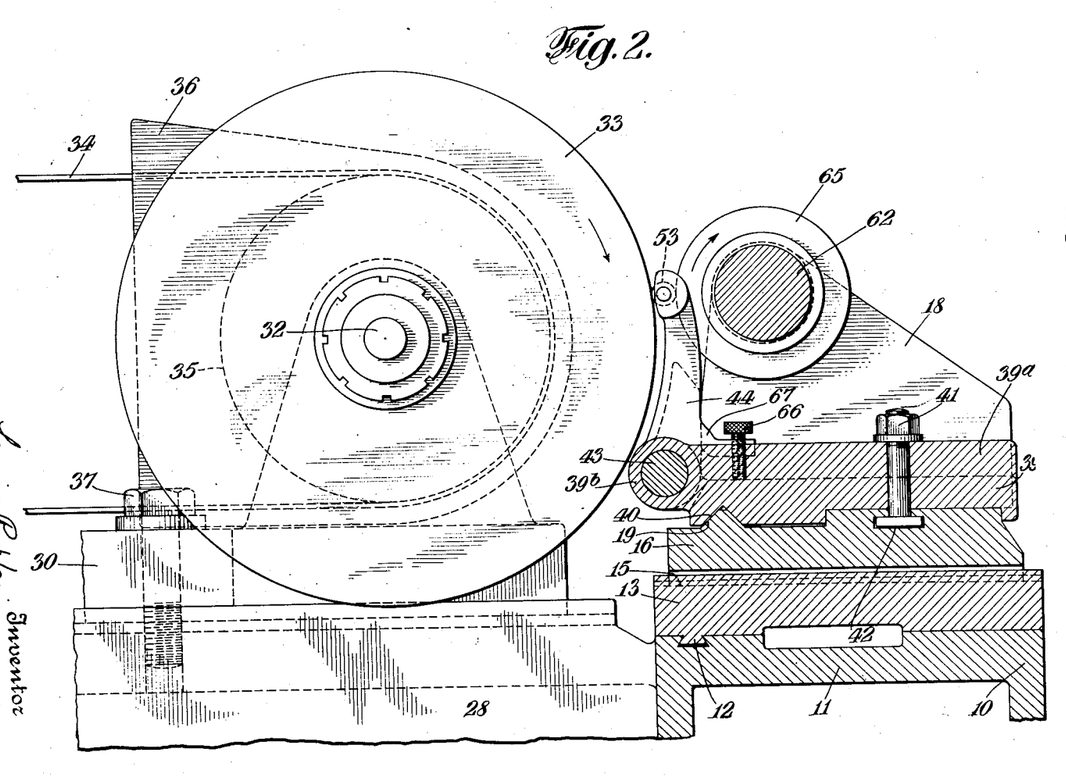
Figure 2 is a sectional elevation on an enlarged scale taken substantially on the line 2—2 of Fig. 1.

Referring now to the drawings and more particularly to Figs. 1 and 2, there is shown a main or supporting frame 10 of any suitable construction provided in the upper part of the bed 11 thereof with ways 12 extending lengthwise of the main frame. Upon the bed 11 of the main frame 10 and cooperating with the ways 12 is slidably supported a lower carriage or table 13, the carriage 13 being thus capable of a slidable movement along the ways 12 as is common in the construction or ordinary external grinders.

Upon the upper surface of the carriage 13 are curved ways or guides 14 and 15 upon which is supported and guided an upper carriage or table 16 upon the respective ends of which are mounted the head stock 17 and tail stock 18. The latter are supported in ways 19 formed in the upper surface of the upper carriage 16 and may be slidably adjusted upon the carriage 16 and longitudinally thereof in the usual manner. Ordinary or usual means are provided for clamping the stocks in adjusted position to the carriage 16.

The head stock 17 has journaled therein a shaft 20 adapted to be driven by means of the pulley 21 and belt 22 and upon that end of the shaft 20 toward the tail stock 18 is rigidly secured a face plate 23 and a live center 24. The tail stock 18 has slidably mounted therein the shaft 25 supporting at its end toward the head stock a dead center 26 and connected at its other end with the screw 27 adapted to adjust the dead center 26 toward or away from the live center 24 associated with the head stock 17.

As will be seen in Figs. 1 and 2, the main frame 10 is provided with a rearward extension 28 having ways 29 therein extending substantially transversely to the bed 11 of the main supporting frame 10. Upon the ways 29 is slidably supported a carriage 30 having suitable bearings 31 in which is journaled the shaft 32 supporting at its outer end a grinding wheel 33 made of any suitable abrasive material. The grinding wheel 33 is adapted to be rotated at a relatively high speed in the direction of the arrow shown in Figs. 1 and 2 by means of a belt 34 cooperating with a pulley 35 rigidly mounted upon the shaft 32 and intermediate of the bearings 31. A suitable casing or housing 36 may be provided for protecting the pulley 35 and belt 34.

The grinding wheel carriage 30 may be adjusted along the ways 29 toward or away from the bed 13 and may be locked in adjusted position by means of the bolts 37, suitable slots 38 being provided in the carriage 30 for cooperation with the clamping bolts 37.

By means of the construction thus far described work may be mounted for rotation upon the live center 24 and the dead center 26 and may be rotated from the head stock 17 by means of a suitable dog coacting with the face plate 23. During such rotation of the work, the grinding wheel 33 may be made operative upon the work so rotated, it being seen that the grinding wheel 33 may be moved toward or away from the axis of rotation of the work on the centers 24 and 26 in accordance with the diameter of the work operated upon and that the carriage 13 may be moved back and forth along the ways 12 in the main frame 10. Furthermore, it will be seen that the curved ways 14 and 15 supporting the upper carriage 16 permit the latter to be adjusted either so that the axis of the work supported upon the centers 24 and 26 will be coincident with the direction of travel of the carriage 13 when it is desired to grind the work supported on the centers to a true cylindrical form or so that the axis of rotation of the work will be at an angle with the direction of travel where it is desired to grind the work in tapered form.

Considering now more particularly certain of the more important features of this invention, there is shown in the drawings a device or attachment comprising what may be termed an auxiliary frame member or supporting plate 39 recessed at one end as at 40 (see Fig. 2) so as to receive the ways 19 of the upper bed or carriage 16 and adapted to be bridged substantially transversely across the carriage 16. The ways 19 and the recess 40 cooperating therewith are thus adapted to align the auxiliary frame member 39 and its associated parts with the centers 24 and 26 of the head stock and tail stock respectively, and a bolt 41 extending through the reinforcing rib 39ª of the plate member 39 and in connection with the slot 42 extending longitudinally in the carriage 16 is adapted to clamp the auxiliary frame or plate member 39 to the carriage 16. Furthermore, it will be noted that the provision of the slot 42 within which the head of the bolt 41 is engaged permits the frame 39 to be adjusted or positioned as may be desired with respect to the related parts of the apparatus hereinbefore described.

At the inner end of the auxiliary frame member 39 there is integrally formed therewith a sleeve 39ᵇ of substantial length (see Fig. 3) and extending through the sleeve 39ᵇ is a supporting shaft or bar 43. The sleeve 39ᵇ is bored out in such manner as to position the axis of the bar 43 substantially parallel to the ways 19 of the carriage 16 and, referring now to Fig. 3 of the drawings, it will be seen that the shaft 43 is adapted to pivotally support a pair of substantially upstanding arms 44 and 45 rigidly connected by and preferably integrally formed with the sleeve-like portions 46 through which the shaft or bar 43 is adapted to pass. A collar 47 upon the end of the bar 43 holds the arms 44 and 45 snugly in relation to the sleeve 39ᵇ of the auxiliary frame 39. The upper end of the inner arm 44 supports a center 48, which center may be rigidly held in position by means of the locking screw 49. The upper end of the outer arm 45 is provided with a suitable sleeve 50 in which is slidably supported the center 51, a thumb screw 52 being provided for locking the center 51 in the desired position. The centers 48 and 51 are adapted to rotatably support a cylindrical body, illustratively shown in Fig. 3 as taking the form of a bolt 53, the centers 48 and 51 acting to determine the axis about which the cylindrical body 53 is to rotate.

Upon the other side of the supporting sleeve 39ᵇ of the auxiliary frame 39 there is positioned and supported upon the shaft 43 the sleeve-like portion 54 having preferably integrally formed therewith the substantially upstanding arms 55 and 56 supporting at their upper ends the fixed center 57 and the center 58 adjustably positioned as by means of the thumb-screw 59 respectively. The construction of the arms 55 and 56 and related parts is substantially similar to that of the arms 44 and 45 hereinabove described. A collar 60 upon the outer end of the shaft or bar 43 maintains the parts in assembled relation with respect to the frame 39. Upon the centers 57 and 58 there is shown in Fig. 3 a cylindrical body, indicated at 61, rotatably supported thereon and having its axis of rotation determined thereby.

Coacting with the auxiliary frame 39 and its related parts, is an arbor 62 rotatably supported upon the centers 24 and 26 of the head stock and tail stock respectively and adapted to be driven from the face plate 23 of the head stock as by means of the dog 63. Upon the arbor 62 is mounted a regulating wheel 64 adapted to coact with the cylindrical body 61 mounted upon the centers 57 and 58 of the arms 55 and 56 hereinbefore described, and also mounted upon the arbor 62 is a second regulating wheel 65 adapted to coact with the cylindrical body 53 mounted upon the centers of the arms 44 and 45 as hereinbefore described. The regulating wheels 64 and 65 may be made of any suitable material, preferably an abrasive, and are preferably of multiple construction. That is, as is shown in Fig. 1, each of the regulating wheels 64 and 65 is preferably composed of a plurality of individual abrasive wheels placed endwise against one another in order that their operative faces may be varied in extent at will by varying the number of multiple parts constituting each wheel for a purpose to be more clearly hereinafter described.

In order to permit the width of the operative faces of the regulating wheels 64 and 65 to be varied as above described, the arbor 62 is preferably provided at one end with a collar 62$^a$ between which and a clamping nut 62$^b$ mounted upon the other end of the arbor 62 the component parts of the several regulating wheels may be clamped, the arbor 62 being of reduced diameter as at 62$^c$ and a suitable sleeve 62$^d$ being interposed between the two regulating wheels 64 and 65.

Figure 3:
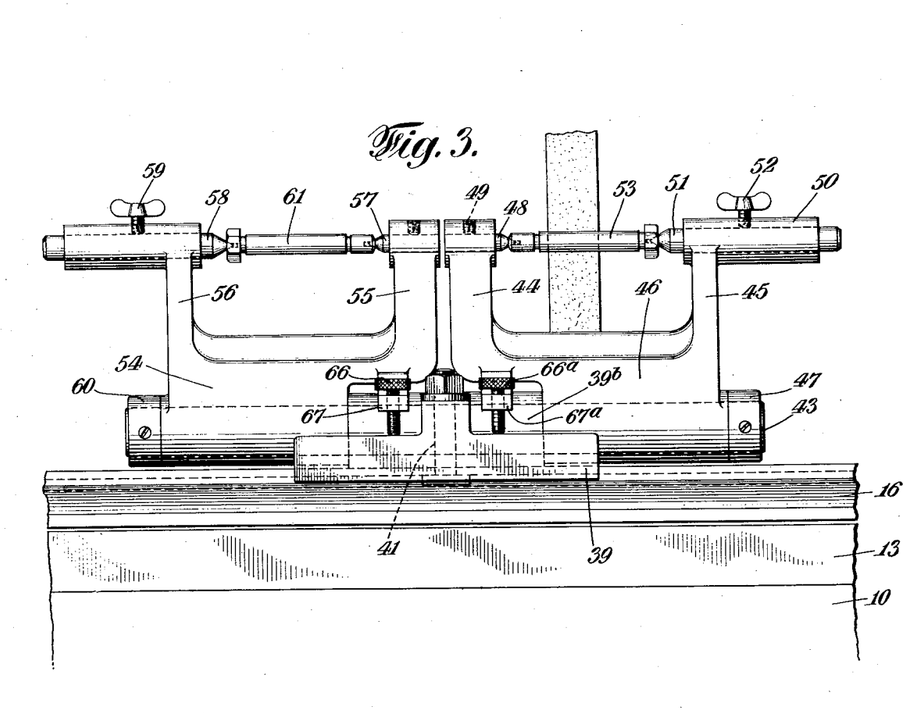
Figure 3 is a front elevation, also on an enlarged scale, as viewed in Fig. 1, certain parts being omitted to show certain features of construction more clearly.

As will be clearly seen in Fig. 1 of the drawings, the regulating wheels 64 and 65 are in their multiple or composite construction given a width of operative face substantially equivalent to the length of the bodies 61 and 53 to be operated upon and, furthermore, that the regulating wheels 64 and 65 and the auxiliary frame 39 with its related parts are so positioned with respect to one another that the cylindrical bodies 61 and 53 when supported upon the centers as hereinbefore described in connection with Fig. 3 will be engaged by the regulating wheels 64 and 65 respectively.

The arbor 62 and its associated regulating wheels 64 and 65 is adapted to be rotated at a relatively low speed in the direction of the arrows indicated in Figs. 1 and 2, and the regulating wheels 64 and 65 taking as before noted preferably the form of abrasive wheels in traveling at a relatively low surface speed and in engaging the cylindrical bodies 61 and 53 respectively exert a materially great friction upon the cylindrical bodies engaged thereby and thus determine and control the rate of rotation upon the supporting centers of the cylindrical bodies operated upon. In Fig. 1 of the drawings the grinding wheels 33 is shown in operative relation to the work 53 supported in the centers of the arms 44 and 45 and in traveling at a relatively high speed performs a grinding operation thereon while the rate of rotation of the body 53 is controlled by the regulating wheel 65. Considering now more in detail the action that takes place during the grinding operation, reference may be had to Fig. 2 of the drawings in which it will be seen that the arms 44 and 45 in being pivotally supported upon the shaft 43 in the auxiliary frame 49 support the centers 48 and 51 respectively and hence the axis of rotation of the work or body 53 eccentrically with respect to the axis of the supporting bar 43; that is, the centers 48 and 51 and hence the axis of rotation of the work 53 are positioned to the right of the vertical plane passing through the axis of the shaft 43. As the regulating wheel 65 rotates the body 53, it being borne in mind that the centers 48 and 51 definitely determine the axis about which the work is rotated, and about which it is to be ground concentrically, the regulating wheel may engage projecting irregularities in the body 53, and causes the work supporting arms 44 and 45 to be swung away from the regulating wheel and about the supporting shaft 43. In so doing, however, the path of movement of the axis of the work 53 is by reason of the eccentricity of the mounting hereinbefore described in a direction upwardly and toward the grinding wheel 33. The grinding wheel 33, however, presents adjacent the work upon which it is operative an operative surface which is inclined away from the vicinity at which the work is supported, and hence during the swinging movement of the arms 44 and 45 in response to the engagement by the regulating wheel of a projecting irregularity in the work the rotating work is brought into operative contact with a more distant portion of the operative surface of the grinding wheel. The grinding action is therefore substantially self-corrective and the effect of irregularities in the work intended to be operated upon, instead of increasing the defects, is to bring about an automatic and self-correcting grinding action. The grinding action, therefore, takes place with great accuracy of action and result.

As shown in Fig. 1, the carriage 13 is so positioned with respect to the grinding wheel 33 that the latter is effective to perform a grinding operation upon the work 53 controlled by the regulating wheel 65. The carriage 13 is, however, made to move longitudinally of the bed 11 so that the grinding action may first take place upon the work 53 associated with the regulating wheel 65. The grinding action upon the work 53 being completed, the carriage 13 in its continued movement to the right as viewed in Fig. 1 brings the work 61 controlled and rotated by the regulating wheel 64 into operative relation to the grinding wheel 63 and completes the grinding operation thereon. It may at this point be noted that the work-supporting centers 57 and 58 are similarly supported as hereinbefore described in connection with Fig. 2 and that the grinding action takes place in substantially the same manner. The carriage 13, it will be seen, is thus adapted to be moved with respect to the grinding wheel 33 to permit the latter to be operative first upon one of the cylindrical bodies supported by the detachable frame 39 and then upon the other.

While the grinding wheel 33 is operative upon one of the cylindrical bodies, as 53 for example, as shown in Fig. 1, the other cylindrical body 61, for example, heretofore operated upon may be replaced by another. While the body 61 is removed from the centers 57 and 58 an adjustable stop taking the form of the screw 66 threaded into the lug 67 integrally formed with the arm 55 is effective to maintain the centers 57 and 58 in approximate operative relation with respect to the regulating wheel 64. It may be noted that by reason of the eccentricity of the mounting of the centers 57 and 58 in the arms 55 and 56 the latter tend normally to swing toward the regulating wheel 64 and thus automatically hold the work supported upon the centers in engagement with the regulating wheel.

As the work is removed from the centers the adjustable stop 66 is effective to limit the movement of the centers toward the regulating wheel so that a new unground piece of work may be readily positioned upon the centers.

As will be seen from Fig. 3 of the drawings, a similar stop taking the form of a screw 66$^a$ acting in the lug 67$^a$ formed in the arm 44 of the other work-supporting device is effective to operate in a similar manner.

Thus it will be seen that the grinding wheel 33 may be made substantially continuously operative upon work to be ground and that during the reciprocating travel of the carriage 16 the adjustable stops 66 and 66$^a$ are effective to prevent too great a retrograde movement of the work-supporting centers, thus making possible a convenient manual manipulation and a high speed of operation and rate of production.

As hereinbefore noted, the curved ways 14 and 15 permit the various operative parts, as well as work-supporting devices mounted upon the carriage 16 to be readily aligned with the path of travel longitudinally of the carriage 16, in order to insure a grinding in non-tapered form. Furthermore, the grinding wheel 33 may by means of its slidable carriage 30 be adjusted toward or away from the regulating wheel in order to permit the operation upon work of various diameters. It will furthermore be noted that in the pivotal mounting of the center supporting arms, such as the arms 44 and 45, the axis about which the work is to rotate is predetermined and the grinding of the surface is made to take place concentrically with respect to the predetermined axis. It should be noted that any suitable means may be provided for truing the wheels and that the work operated upon by the wheels may be of cylindrical form throughout and is merely illustratively shown in the drawing as comprising a stud or bolt only the cylindrical portions of which it is desired to grind to true cylindrical form.

It will thus be seen that there has been provided in this invention grinding apparatus in which the various objects of this invention are achieved and in which many advantages are attained; wherein the work to be operated upon is readily and conveniently positioned in operative relation to the grinding wheel and is furthermore rigidly supported or backed throughout its extent by the regulating wheel during the action thereon of the grinding wheel, thus insuring a uniform diameter and effectively avoiding the detrimental effects of spring or bending of the parts between the supporting centers. Furthermore, it will be seen that in avoiding the use of clamping dogs for positively rotating the work in the usual form of grinding apparatus, a greater convenience of manipulation and a greater speed of operation as well as highly accurate results are attained.

As many possible embodiments might be made of the above invention and as many changes might be made in the embodiment above set forth, it is to be understood that all matter hereinbefore set forth or shown in the accompanying drawings is to be interpreted as illustrative and not in a limiting sense.

I claim:

1. In apparatus of the general nature of that herein described, in combination, a grinding wheel adapted to be rotated at a relatively high speed; a regulating wheel adapted to be rotated at a relatively low speed, said wheels being adapted to present adjacent operative surfaces traveling in opposite directions; work supporting means providing a definite axis of rotation for a round body supported thereon and in operative relation to said wheels, said regulating wheel engaging said body on one side thereof to rotate said body and said grinding wheel engaging said body on substantially the other side thereof and providing an operative surface inclined away from said body for action thereon; and means effective to permit movement of said work supporting means as said regulating wheel engages projecting irregularities in said body thereby to cause a more distant portion of said inclined operative surface of said grinding wheel to become operative upon said body.

2. In apparatus of the general nature of that herein described, in combination, a grinding wheel adapted to be rotated at a relatively high speed; a regulating wheel adapted to be rotated at a relatively low speed, said wheels being adapted to present adjacent operative surfaces traveling in opposite directions; work supporting means providing a definite axis of rotation for a round body supported thereon and in operative relation to said wheels, said regulating wheel engaging said body on one side thereof to rotate said body and said grinding wheel engaging said body on substantially the other side thereof and providing an operative surface inclined away from said body for action thereon; and means for automatically positioning said supporting means with respect to said inclined surface to maintain a constant distance between said inclined surface of said grinding wheel and the axis of rotation of said body as said regulating wheel engages irregularities in said body.

3. In apparatus of the general nature of that herein described, in combination, a grinding wheel adapted to be rotated at a relatively high speed; a regulating wheel adapted to be rotated at a relatively low speed, said wheels being adapted to present adjacent operative surfaces traveling in opposite directions; means having a pair of centers adapted to rotatably support thereon a round body in operative relation to said wheels, said regulating wheel engaging said body on one side thereof to rotate said body and said grinding wheel engaging said body on substantially the other side thereof and providing an operative surface inclined away from said body for action thereon; and means effective to move said supporting centers to permit a more distant portion of said inclined operative surface of said grinding wheel to become operative upon said body as said regulating wheel engages projecting irregularities in said body.

4. In apparatus of the general nature of that herein described, in combination, a grinding wheel adapted to be rotated at a relatively high speed; a regulating wheel adapted to be rotated at a relatively low speed, said wheels being adapted to present adjacent operative surfaces traveling in opposite directions; means having a pair of centers adapted to rotatably support thereon a round body in operative relation to said wheels, said regulating wheel engaging said body on one side thereof to rotate said body and said grinding wheel engaging said body on substantially the other side thereof and providing an operative surface inclined away from said body for action thereon; and means movably mounting said centers and adapted to be moved by said regulating wheel as the latter engages projecting irregularities in said body thereby to move said body relative to said grinding wheel to permit a more distant portion of the inclined surface of said grinding wheel to become operative upon said body.

5. In apparatus of the general nature of that herein described, in combination, a grinding wheel adapted to be rotated at a relatively high speed; a regulating wheel adapted to be rotated at a relatively low speed, said wheels being adapted to present adjacent operative surfaces traveling in opposite directions; a pair of centers for rotatably supporting a round body substantially between said wheels, said regulating wheel engaging said body to rotate the same and said grinding wheel providing an operative surface inclined away from said body for performing a grinding operation thereon; and means pivotally mounted with respect to said grinding wheel for supporting said centers and to permit said centers to be swung upwardly toward said grinding wheel to cause a more distant portion of said inclined operative surface of said grinding wheel to become operative upon said body as said regulating wheel engages projecting irregularities in said body.

6. In apparatus of the general nature of that herein described, in combination, a grinding wheel adapted to be rotated at a relatively high speed; means for rotatably supporting a round body; means substantially aligned with said first-mentioned supporting means adapted to rotatably support another round body; means for rotating the body supported by each of said supporting means; and means for successively positioning said supporting means in operative relation to said grinding wheel to permit replacement of one of said bodies while said grinding wheel is operative upon the other.

7. In apparatus of the general nature of that herein described, in combination, a grinding wheel adapted to be rotated at a relatively high speed; means for rotatably supporting a round body; means substantially aligned with said first-mentioned supporting means adapted to rotatably support another round body; means for rotating the body supported by each of said supporting means; and means adapted to permit said grinding wheel to operate successively upon the bodies respectively supported by said supporting means to permit replacement of one of said bodies while said wheel is operative upon the other.

8. In apparatus of the general nature of that herein described, in combination, a grinding wheel adapted to be rotated at a relatively high speed; means for rotatably supporting a round body; means substantially aligned with said first-mentioned supporting means adapted to rotatably support another round body; a regulating wheel adapted to be rotated at a relatively low speed associated with each of said body supporting means to rotate the body supported thereon; and means permitting said grinding wheel to operate successively upon said bodies respectively supported by said supporting means whereby one of said bodies may be replaced while said grinding wheel is operative upon the other.

9. In apparatus of the general nature of that herein described, in combination, a grinding wheel adapted to be rotated at a relatively high speed; a plurality of means for rotatably supporting a round body; a regulating wheel adapted to be rotated at a relatively low speed associated with each of said supporting means and adapted to engage and rotate the body supported thereon, said supporting means tending to urge the body supported thereon towards said regulating wheel; means adapted to permit said grinding wheel to be successively associated with said supporting means and to perform a grinding operation first upon one of said bodies and then upon another whereby one of said bodies may be replaced while said grinding wheel is operative upon another; and means associated with each of said supporting means for limiting the movement thereof towards said regulating wheel while one of said supporting means is out of operative relation to said grinding wheel to permit the replacement of the body supported thereon.

10. In apparatus of the general nature of that herein described, in combination, a grinding wheel adapted to be rotated at a relatively high speed; a pair of centers for rotatably supporting a round body; a second pair of centers for rotatably supporting another round body; a regulating wheel adapted to be rotated at a relatively low speed associated with each of said pairs of centers for engaging and rotating the body supported by said centers; means mounting each of said pairs of centers tending to urge each of said pairs of centers towards its associated regulating wheel; means permitting said grinding wheel to perform a grinding operation first upon one of said bodies and then upon the other whereby one of said bodies may be replaced while said grinding wheel is operative upon the other; and means associated with each of said center mounting means for limiting the movement of each pair of centers towards the regulating wheel.

11. In apparatus of the general nature of that herein described, in combination, a pair of centers for rotatably supporting work of round section, a regulating wheel adapted to be rotated at a relatively low speed and operatively related to said centers to permit said regulating wheel to engage the work on one side thereof, thereby to control the rotation of the work, a grinding wheel adapted to be rotated at a relatively high speed and operatively related to said centers to permit said grinding wheel to perform a grinding action upon the work and substantially at the other side thereof, means mounting said centers to permit said centers to move with the work supported thereon in a direction toward or away from one of said wheels and to urge said centers with the work thereon in a direction toward said regulating wheel, and means for causing a relative movement to take place between said grinding wheel and said work supporting centers in a general direction lengthwise of the work.

12. In apparatus of the general nature of that herein described, in combination, a grinding wheel adapted to be rotated at a relatively high speed; means having a pair of centers for rotatably supporting a round body and for determining the axis about which said body rotates; means mounting said pair of centers to support said body in operative relation to said grinding wheel; and a regulating wheel adapted to be rotated at a relatively low speed positioned to engage and rotate said round body.

13. In apparatus of the general nature of that herein described, in combination, a grinding wheel adapted to be rotated at a relatively high speed; means having a pair of centers for rotatably supporting a round body in operative relation to said grinding wheel; a regulating wheel adapted to be rotated at a relatively low speed and positioned to engage and rotate said round body; and means adapted to permit relative movement to take place between the axis of rotation of said body and said regulating wheel as said regulating wheel engages irregularities in said body.

14. In apparatus of the general nature of that herein described, in combination, a grinding wheel adapted to be rotated at a relatively high speed; a pair of centers for supporting a round body in operative relation to said grinding wheel and for determining the axis about which said body is to rotate; a regulating wheel adapted to be rotated at a relatively low speed and positioned to engage and rotate said round body supported on said centers; means for adjusting one of said wheels toward or away from the other; and means mounting said centers and acting automatically to position said axis of rotation determined by said pair of centers relatively to one of said wheels.

15. In apparatus of the general nature of that herein described, in combination, a grinding wheel adapted to be rotated at a relatively high speed; a pair of centers for rotatably supporting a round body in operative relation to said grinding wheel and for determining the axis about which said body rotates; a regulating wheel adapted to be rotated at a relatively low speed and to engage and rotate said round body; means for adjusting one of said wheels toward or away from the other; and pivotal means for mounting said centers between said two wheels and adapted to permit said centers to be automatically positioned between said two wheels.

16. In apparatus of the general nature of that herein described, the combination with an external grinder comprising a supporting frame, a grinding wheel rotatably mounted at the rear of said frame and centering means adapted to rotatably support a cylindrical body in operative relation to said grinding wheel, of a regulating wheel adapted to be rotatably supported by said centering means and to be rotated at a relatively low speed and means detachably mounted upon said frame and having a pair of centers for rotatably supporting a round body in operative relation to said two wheels, said regulating wheel being adapted to rotate said body and said grinding wheel being adapted to perform a grinding operation thereon.

17. In apparatus of the general nature of that herein described, the combination with an external grinder comprising a supporting frame, a grinding wheel rotatably mounted at the rear of said frame and centering means adapted to rotatably support a cylindrical body in operative relation to said grinding wheel, of a regulating wheel adapted to be rotatably supported by said centering means and to be rotated thereon at a relatively low speed, a pair of centers for rotatably supporting a round body, means for detachably and pivotally mounting said centers upon said frame to position said round body supported by said centers in operative relation to said grinding wheel and to said regulating wheel thereby to be rotated by said regulating wheel and to be operated upon by said grinding wheel, and means for adjusting one of said wheels toward or away from the other.

18. In apparatus of the general nature of that herein described, the combination with an external grinder comprising a supporting frame, a grinding wheel rotatably mounted at the rear of said frame, centering means adapted to rotatably support a cylindrical body in operative relation to said grinding wheel, and means permitting relative adjustment between said grinding wheel and said centering means toward or away from each other to take place, of a regulating wheel rotatably supported by said centering means and adapted to be rotated thereon at a relatively low speed, an auxiliary frame adapted to be detachably secured to said supporting frame, a pair of centers adapted to support a round body in operative relation to said two wheels and to be rotated by said regulating wheel, and means mounting said last-mentioned pair of centers upon said auxiliary frame to permit said centers to be automatically positioned with the body supported thereon between the operative surfaces of said two wheels.

19. In apparatus of the general nature of that herein described, the combination with an external grinder comprising a supporting frame, a grinding wheel rotatably mounted upon said frame and centering means adapted to rotatably support a cylindrical body in operative relation to said grinding wheel, of a regulating wheel adapted to be rotatably supported by said centering means and to be rotated thereon at a relatively low speed, a pair of rigidly connected arms each having a center mounted thereon for rotatably supporting a round body, an auxiliary frame adapted to be detachably mounted upon said supporting frame, means pivotally mounting said arms upon said auxiliary frame whereby said centers may support said round body in operative relation to said two wheels, and means for limiting the movement of said arms about said pivotal mounting means toward said regulating wheel.

20. In apparatus of the general nature of that herein described, in combination, a main frame provided with ways extending longitudinally thereof; a table slidable upon said ways and having a tail stock and a driving head stock provided with centers; a grinding wheel rotatably mounted exteriorly of said ways; two regulating wheels supported in spaced relation and adapted to be rotated at relatively low speed on said centers; an auxiliary frame adapted to be detachably secured to said table; and means mounted upon said auxiliary frame providing two pairs of centers for respectively supporting rotatably two round bodies in operative relation to said two regulating wheels, said regulating wheels being thereby adapted to engage and rotate said bodies and said slidable table permitting said two round bodies to be moved alternately into operative relation to said grinding wheel to permit the replacement of one of said bodies while said grinding wheel is operative upon the other.

21. In apparatus of the general nature of that herein described, in combination, a main frame provided with ways extending longitudinally thereof; a table slidably mounted upon said ways and having a tail stock and a driving head stock provided with centers; a grinding wheel mounted exteriorly of said ways; means for relatively adjusting said table on said ways and said grinding wheel toward or away from one another, said centers being adapted to rotatably support a cylindrical body in operative relation to said grinding wheel; two regulating wheels rotatably mounted in spaced relation and coaxial upon said centers and adapted to be driven at a relatively low speed thereon; and an auxiliary frame adapted to be detachably secured to said table and having mounted thereon two pairs of centers for respectively supporting rotatably two round bodies in operative relation to said two regulating wheels respectively, said regulating wheels being adapted thereby to engage and to rotate said round bodies and said slidable table permitting said two round bodies to be brought alternately in operative relation to said grinding wheel to permit replacement of one of said bodies while said grinding wheel is operative upon the other.

22. In apparatus of the general nature of that herein described, in combination, means for supporting work of round section and adapted to permit rotation thereof, a regulating wheel rotatable at a relatively low speed and operatively related to said work supporting means to permit said regulating wheel to engage the work on one side thereof, thereby to control the rotation of the work, a grinding wheel rotatable at a relatively high speed and operatively related to said work supporting means to permit said grinding wheel to perform a grinding action upon the work and substantially at the other side thereof, said regulating wheel having an exposed operative face for contacting with the work of greater extent than the operative face of said grinding wheel, and means for causing a relative movement between said regulating wheel and said grinding wheel in the general direction in which the work extends.

23. In apparatus of the general nature of that herein described, in combination, means for supporting work of round section adapted to permit rotation of the work while preventing movement of the work in substantially an axial direction with respect thereto, a regulating wheel rotatable at a relatively low speed and operatively related to said work supporting means to permit the regulating wheel to engage the work on one side thereof, thereby to control the rotation of the work, a grinding wheel rotatable at a relatively high speed and operatively related to said work supporting means to permit the grinding wheel to perform a grinding operation upon the work and substantially at the other side thereof, and means for causing a relative movement between the work and said grinding wheel in a general direction lengthwise of the work.

24. In apparatus of the general nature of that herein described, in combination, a grinding wheel adapted to be rotated at a relatively high speed, a regulating wheel adapted to be rotated at a relatively low speed, said wheels presenting adjacent operative surfaces traveling in opposite directions, means for supporting work of round section between the adjacent operative surfaces of said two wheels adapted to permit movement of the work laterally in a direction toward or away from one of said wheels while preventing movement of the work in a direction substantially lengthwise thereof, and means for causing a relative movement between the work and said grinding wheel in a general direction lengthwise of the work.

25. In apparatus of the general nature of that herein described, in combination, a grinding wheel adapted to be rotated at a relatively high speed; a plurality of means, each having a pair of centers for rotatably supporting a round body for operation thereon by said grinding wheel; means for causing relative movement between said plurality of supporting means and said grinding wheel arranged to permit said grinding wheel to operate successively upon the bodies supported by said plurality of pairs of centers and to permit replacement of a body operated upon by said grinding wheel while the latter is operative upon another; and a regulating wheel for controlling the rotation of the body being operated upon by said grinding wheel, said regulating wheel being rotatable at relatively low speed and to present an operative surface traveling in a direction opposite from that of the operative surface of said grinding wheel.

26. In apparatus of the general nature of that herein described, in combination, a grinding wheel adapted to be rotated at a relatively high speed; a plurality of means each adapted to rotatably support a round body for operation thereon by said grinding wheel; means for causing relative movement between said work supporting means and said grinding wheel arranged to permit said grinding wheel to operate successively upon the bodies supported by said plurality of supporting means and to permit replacement of one of said bodies while said grinding wheel is operative upon another; and a regulating wheel for controlling the rotation of the body being operated upon by said grinding wheel, said regulating wheel being rotatable at a relatively low speed and to present an operative surface traveling in a direction opposite from that of the operative surface of said grinding wheel.

27. In apparatus of the general nature of that herein described, in combination, a grinding wheel rotatable at a grinding speed and adapted to perform a grinding operation on one portion of a work piece, a regulating wheel rotatable at a relatively low and hence at a work-rotation-controlling speed and adapted to engage another portion of a work piece, said regulating wheel being rotated in a direction to control the rotation of the work piece while said grinding wheel performs a grinding operation thereon and having a wider work-engaging surface than that of said grinding wheel, means for holding a work piece in operative relation to said two wheels and adapted to permit rotation thereof by said regulating wheel, and mechanism for causing a relative movement between said wider-faced regulating wheel and the work piece on the one hand and said grinding wheel on the other hand in a general direction lengthwise of the work during the grinding operation by said grinding wheel and then to cause relative disengagement between the work piece and said grinding wheel, thereby to permit removal of the finished work piece.

28. In apparatus of the general nature of that herein described, in combination, a grinding wheel adapted to be rotated at a relatively high speed; means adapted to engage and rotatably hold a work piece and to determine its axis of rotation; a regulating wheel adapted to be rotated at a relatively low speed and positioned to engage and rotate said work piece; and means movably mounting said work-engaging means adapted to give it and the work piece supported thereby free movements in a general direction toward or away from one of said wheels.

29. In apparatus of the general nature of that herein described, in combination, a grinding wheel adapted to be rotated at a relatively high speed; means adapted to engage and rotatably hold a work piece and to determine its axis of rotation; a regulating wheel adapted to be rotated at a relatively low speed and positioned to engage and rotate said work piece; and means movably mounting said work-engaging means and urging it and the work piece held thereby in a direction to hold the work piece in contact with said regulating wheel.

30. In apparatus of the general nature of that herein described, in combination, a grinding wheel adapted to be rotated at a relatively high speed; a regulating wheel adapted to be rotated at a relatively low speed and positioned to engage and rotate work of round section interposed between itself and the grinding wheel; means for supporting work of round section between said two wheels; and means pivotally mounting said work-supporting means adapted to permit oscillation of said work-supporting means in a direction toward or away from one of said wheels.

31. In apparatus of the general nature of that herein described, in combination, a grinding wheel adapted to be rotated at a relatively high speed; a regulating wheel adapted to be rotated at a relatively low speed and positioned to engage and rotate work of round section interposed between itself and the grinding wheel; means for supporting work of round section between said two wheels; and means movably mounting said regulating wheel to permit it to be moved out of effective operative relation to said grinding wheel and pivotally supporting said work-supporting means adapted upon movement of said regulating wheel out of operative relation to said grinding wheel to cause said work-supporting means to hold the work in contact with said regulating wheel.

32. In apparatus of the general nature of that herein described, in combination, a grinding wheel rotatable at a grinding speed and adapted to perform a grinding operation on one portion of a work piece, a regulating wheel adapted to engage another portion of a work piece, said regulating wheel being rotated in a direction and at a low speed to control the rotation of the work piece while said grinding wheel performs a grinding operation thereon, means for holding a work piece in operative relation to said two wheels and adapted to permit rotation thereof by said regulating wheel, means relatively mounting said grinding wheel on the one hand and said regulating wheel and work-holding means on the other hand to permit relative movement therebetween in a direction lengthwise of the axis of rotation of the work piece, and means causing said relative movement to take place during grinding contact between said grinding wheel and the work piece and to continue said movement sufficiently to bring said two wheels out of juxtaposed relation, said work-holding means being constructed and operating to yieldingly urge the work piece into contact with the surface of said regulating wheel when said two wheels are out of juxtaposed relation.

33. In apparatus of the general nature of that herein described, in combination, a grinding wheel rotatable at a grinding speed and adapted to perform a grinding operation on one portion of a work piece, a regulating wheel rotatable at a relatively low speed and adapted to engage another portion of a work piece, said regulating wheel being rotated in a direction to control the rotation of the work piece while said grinding wheel performs a grinding operation thereon, means for holding a work piece in operative relation to said two wheels, and adapted to permit rotation thereof by said regulating wheel, and mechanism for causing a relative movement between the work piece and said grinding wheel in a general direction lengthwise of the work during the grinding operation by said grinding wheel and to continue such relative movement until said work piece and said grinding wheel are disengaged, thereby to permit removal of the ground work piece, said work-holding means being constructed to prevent relative axial movement between the work piece held thereby and itself.

34. In apparatus of the general nature of that herein described, in combination, a grinding wheel rotatable at a grinding speed and adapted to perform a grinding operation on one portion of a work piece, a regulating wheel adapted to engage another portion of a work piece, said regulating wheel being rotated in a direction and at a low speed to control the rotation of the work piece while said grinding wheel performs a grinding operation thereon, means for holding a work piece in operative relation to said two wheels and adapted to permit rotation thereof by said regulating wheel, a reciprocating carriage mounted for movement past the operative surface of said grinding wheel, and means mounting said regulating wheel and said work-holding means on said carriage.

35. In apparatus of the general nature of that herein described, in combination, a grinding wheel rotatable at a grinding speed and adapted to perform a grinding operation on one portion of a work piece, a regulating wheel adapted to engage another portion of a work piece, said regulating wheel being rotated in a direction and at a low speed to control the rotation of the work piece while said grinding wheel performs a grinding operation thereon, means for holding a work piece in operative relation to said two wheels and adapted to permit rotation thereof by said regulating wheel, means for adjusting the distance between the operative surfaces of said two wheels, thereby to predetermine the thickness to which the work piece is to be ground by said grinding wheel, and a movable carriage supporting said work-holding means and said regulating wheel and moving in recurring cycles to operatively relate said work-holding means and regulating wheel to said grinding wheel and to remove said work-holding means and regulating wheel out of operative relation to said grinding wheel.

36. In apparatus of the general nature of that herein described, in combination, a grinding wheel rotatable at a grinding speed and adapted to perform a grinding operation on one portion of a work piece, a regulating wheel adapted to engage another portion of a work piece, said regulating wheel being rotated in a direction and at a low speed to control the rotation of the work piece while said grinding wheel performs a grinding operation thereon, means for holding a work piece in operative relation to said two wheels and adapted to permit rotation thereof by said regulating wheel, means for adjusting the distance between the operative surfaces of said two wheels, thereby to predetermine the thickness to which the work piece is to be ground by said grinding wheel, and a movable carriage supporting said work-holding means and said regulating wheel and moving in recurring cycles to operatively relate said work-holding means and regulating wheel to said grinding wheel and to remove said work-holding means and regulating wheel out of operative relation to said grinding wheel, said work-holding means being constructed and operating to maintain a work piece in operative relation to said regulating wheel when said carriage has moved in a direction to carry said work-holding means and said regulating wheel out of operative relation to said grinding wheel.

In testimony whereof, I have signed my name to this specification this 4th day of April, 1922.

LEWIS R. HEIM.